June 11, 1963  P. J. IMSE  3,093,235

CONVEYOR CHAIN

Filed May 16, 1962

United States Patent Office 3,093,235
Patented June 11, 1963

---

3,093,235
CONVEYOR CHAIN
Philip J. Imse, Wauwatosa, Wis., assignor to Chain Belt Company, Milwaukee, Wis., a corporation of Wisconsin
Filed May 16, 1962, Ser. No. 195,145
4 Claims. (Cl. 198—129)

This invention relates to conveyor chain of the type having links which articulate for operation over sprockets and also have large clearances between links to allow the chain to flex laterally for travel in an arc. The chain generally operates in a channel having sides to guide the chain and a bottom over which the chain slides. The objects such as boxes or cases to be transported are placed directly on the top of the chain which projects sufficiently above the channel for that purpose. The parts of the chain travelling in straight lines may slide directly over the floor with the boxes or cases thereon. The chain operates without lubrication, and wear on the opposite sides of the chain is equalized by turning the chain over after a period of operation. As a conveyor, the chain may be several hundred feet in length and subject to tensions of 4,000 pounds and over.

According to the present invention, the pin link of the chain comprises a pair of stamped steel side bars which are inwardly bowed at the pins to center the connecting block links on the pin and also allow the block link to swing laterally respecting the chain. The configuration of the side bars allows the chain pin to be larger in diameter and shorter in length and protects the ends of the pins on the outside of the chain. Such protection allows relatively simple means, such as the staking shown in the drawings, to be used for securement of the pin. The bowed section at the pin facilitates removal of the pin with any suitable tools.

The object of the present invention is to provide an improved chain link of steel construction having a width between bars allowing the flexing referred to and the strength and resistance to wear required. At the present time, only forgings have limitedly provided these requirements.

The drawings furnished herewith illustrate the best mode of carrying out the invention as presently contemplated and set forth hereinafter.

Figure 1:
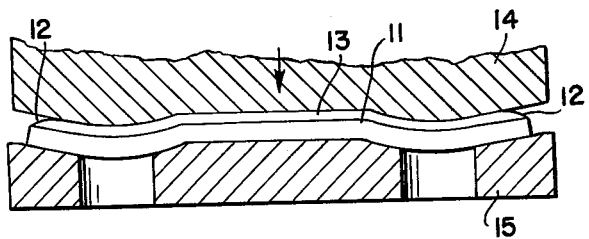
FIGURE 1 shows the forming dies in cross-section and the stamped bar in elevation therebetween.
Figure 2:
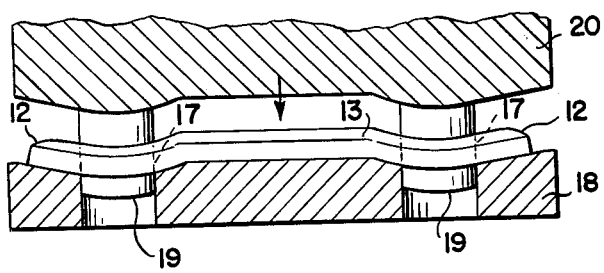
FIG. 2 shows the upper and lower punching dies in cross-section and the punched bar in elevation.
Figure 5:
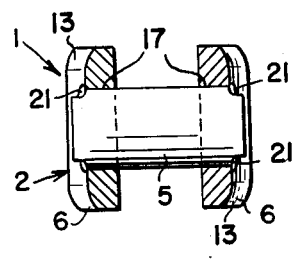
FIG. 5 is a section taken on line 5—5 of FIG. 3 through the pin of the link.
Figure 3:
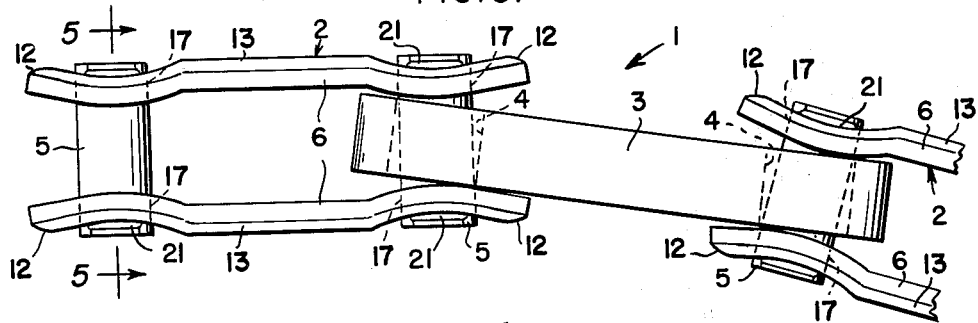
FIG. 3 is a plan view of a section of the assembled chain.
Figure 4:
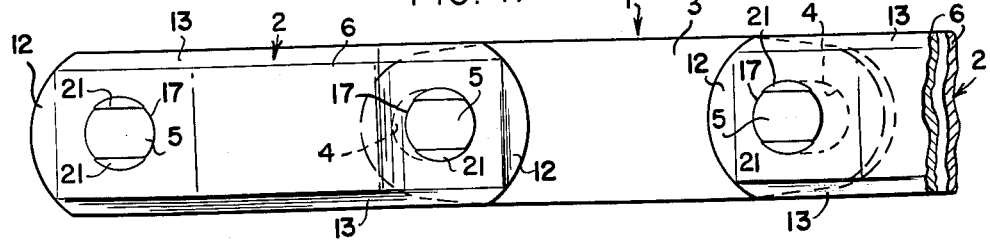
FIG. 4 is a side view of the section of chain shown in FIG. 3.

The chain 1 shown in the drawings comprises the pin links 2 and intermediate block links such as the forged link 3 having an elongated hole 4 at each end. The pins 5 of links 2 extend through holes 4 and join the side bars 6 of links 2.

Each bar 6 is first blanked from steel plate or strip of the necessary thickness. A thickness of about one-quarter of an inch would be required for a chain of two and one-half inch pitch (distance between centers of pins) and up to three-eighths of an inch for chain of larger sizes. The ends and edges of one side of the blank 11 are then beveled as at 12 and 13 by suitable swaging means, not shown, and the flat blank 11 is then formed between the complementary upper and lower stamping dies 14 and 15, respectively.

In the stamping operation the end portions of the blank are bowed so that the locations of the holes for the pins 5 are displaced inwardly of the chain about one-half the thickness of the bar. About two-sevenths of the blank at each end is bowed. The proportions mentioned are those shown and depend upon the dimensions of the completed chain. It is important that the ends of the blank 11 approximately reach the plane of the flat central section of the blank.

Blank 11, after being bowed, is then punched to form the pin holes 17. The blank is held on the lower die 18 having the same shape as the inside of the blank and the ends of punches 19 of the upper die 20 are curved to correspond with the inside contour of the bowed sections.

After forming and punching, the beveled edges 13 of bars 6 may be induction hardened for resistance to wear. Preferably, the hardened zone should not reach to the areas around holes 17 because of the interference fit of pins 5 in the holes.

In the assembly of the chain, the ends of pins 5 are pressed through corresponding holes 17 of side bars 6 with links 3 therebetween. The diameter of pins 5 is larger than that of the holes 17 to provide a moderate interference fit requiring for example three to five thousand pounds force to effect the assembly. The ends of pins 5 are suitably rounded and may also have a center section of a slightly larger diameter to provide oppositely facing, annular shoulders, not shown, against which the bowed sections of the bars may abut. The shoulders, referred to, however, are not essential except for convenience in locating the bars on the ends of the pins so that pins 5 project no further than the beveled ends 12 of corresponding bars 6.

The projecting length of pins 5 within the contour of the bowed sections of bars 6 is not sufficient to allow the conventional use of pins or other separate locking devices, insofar as is known. However, the staking of the pins by upsetting the top and bottom corners 21 provides enough of the metal of the pin to overlie the plate so that such securement means is entirely adequate and the removal of the plate by grinding the small overlying lips of the pin or driving the plate from the pin and shearing the lips is a relatively easy disassembly procedure.

In the operation of chain 1 the links 3 are held loosely between the bowed sections of the bars 6 of links 2 but can swing laterally to the degree necessary to allow the chain to move in an arc.

The bowed sections of bars 6 must be long enough to accommodate the movement of links 3 and the degree of curvature of each section must be enough to allow the desired degree of lateral flexing. The degree of flexing refers to the maximum angularity between each link of the chain and a line parallel to either adjacent link.

The looseness referred to should not require a relatively large spacing between links 3 and bars 6. This is important because projecting parts of the cases or articles being conveyed can fall or catch in between links and bars having a large spacing which is greatest when the chain is in a straight line. Also, with the supported ends of the pin as close together as possible, the bending of the chain pin is minimized or maximum strength of the pin is provided.

The chain construction of the present invention may be extremely rugged and in particular provides a chain of the desired base width for stability in operation. That is, boxes or cases which slide laterally on to or from the chain will not readily tip the chain over on its side. The protection provided the ends of the pins is also essential particularly considering the ease of chain disassembly which is made possible by the relatively easily removed parts overlying the bars 6.

The steel construction of bars 6 allows pins 5 to be of larger diameter so that their service life corresponds with normal chain life. That is, in comparable cast chain constructions the metal of the chain links around the pin holes required for minimum strength allows only the use of pins of limited diameter. Since the pins are subject to considerable wear in chain operation, this limitation is avoided in the construction of the present invention. This is important especially because in most applications, such as mentioned, the chain operates without lubrication. Further extended chain life is, of course, always provided whenever lubrication can be effected.

Various embodiments of the invention may be employed within the scope of the accompanying claims.

I claim:

1. In a chain comprising alternate pin links and block links, parallel pins and spaced bars of stamped construction with a section at each end of each bar bowed inwardly respecting the center line of the chain, the center sections of the bars of the pin links being parallel and defining the width of the chain, each end of each pin link having a pin with ends extending through corresponding holes at the midpoints of the bowed sections of the bars, the said midpoints being spaced to hold the block link therebetween with only such clearance required to allow the block link to rock on either bowed section for the lateral flexing of the chain.

2. In a chain of the type having block links with elongated holes at each end for the pins extending therethrough to allow lateral flexing of the chain for operation around arcuate guide means, pin links comprising the pins referred to and spaced bars of stamped construction with a section at each end of each bar bowed inwardly toward the center of the chain, each bar having a hole formed at the approximate midpoint of each bowed section, the corresponding ends of each pin link being connected by a pin having end portions fitted in the respective holes of the bars with the corresponding end of the adjacent block link disposed between the midpoints of the bowed sections provided with sufficient clearance to allow the block link to rock on either bowed section for the lateral flexing referred to, the spaced intermediate sections of the bars defining the lateral dimensions of the chain and said pins having projecting ends within said dimensions and portions overlying the bars for their securement on the pins, the ends of said pins and said portions within bowed sections being protected as against wear on the guide means required for the lateral flexing referred to.

3. In a chain of the type having block links with elongated holes at each end for the pins extending therethrough to allow lateral flexing of the chain, pin links comprising the pins referred to and spaced bars of stamped construction with a section at each end of each bar bowed inwardly respecting the center of the chain, each bar having a hole formed at the approximate midpoint of each bowed section, the corresponding ends of each pin link being connected by a pin having end portions fitted in the respective holes of the bars with the corresponding end of the adjacent block link disposed between the midpoints of the bowed sections with sufficient clearance to allow the block link to rock on either bowed section for the lateral flexing referred to, the spaced intermediate sections of the bars defining the lateral dimensions of the chain and said pins having securement means within said dimensions and overlying the bars for their securement on the pins, the ends of said pins and said means within said bowed sections being protected against wear as on the guide means required for the lateral flexing referred to.

4. In a chain of the type comprising alternate pin links having spaced pins and connecting links having holes at each end through which the corresponding pins extend with a clearance allowing the connecting links to swing laterally of the chain and allow the chain to move in an arc, said pin links further including spaced bars overlying adjacent ends of the connecting links and having holes in which the ends of said pins are secured, the improvement in said chain characterized by the stamped construction of said bars whereby end sections of each bar are bowed inwardly respecting the chain so that the space therebetween at each pin is just sufficient for said lateral movement of the connecting link and the space between the center section of the bars is at least sufficient to allow said lateral movement of the connecting link.

No references cited.